United States Patent
Tanimoto et al.

(10) Patent No.: US 11,004,007 B2
(45) Date of Patent: May 11, 2021

(54) PREDICTOR MANAGEMENT SYSTEM, PREDICTOR MANAGEMENT METHOD, AND PREDICTOR MANAGEMENT PROGRAM

(71) Applicant: NEC Corporation, Tokyo (JP)

(72) Inventors: Akira Tanimoto, Tokyo (JP); Yousuke Motohashi, Tokyo (JP); Hiroki Nakatani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 872 days.

(21) Appl. No.: 15/556,201

(22) PCT Filed: Mar. 23, 2015

(86) PCT No.: PCT/JP2015/001621
§ 371 (c)(1),
(2) Date: Sep. 6, 2017

(87) PCT Pub. No.: WO2016/151617
PCT Pub. Date: Sep. 29, 2016

(65) Prior Publication Data
US 2018/0039901 A1    Feb. 8, 2018

(51) Int. Cl.
G06N 5/04 (2006.01)
G06N 7/00 (2006.01)
G06Q 10/04 (2012.01)
G06Q 10/00 (2012.01)
G06N 20/00 (2019.01)

(52) U.S. Cl.
CPC ............. *G06N 7/005* (2013.01); *G06N 5/046* (2013.01); *G06N 20/00* (2019.01); *G06Q 10/00* (2013.01); *G06Q 10/04* (2013.01); *G06N 5/04* (2013.01)

(58) Field of Classification Search
None
See application file for complete search history.

(56) References Cited

FOREIGN PATENT DOCUMENTS

| JP | 10-074188 A | 3/1998 |
| JP | 11-104984 A | 4/1999 |
| JP | 2018-508874 A | 3/2018 |
| WO | 2016/118815 A1 | 7/2016 |

OTHER PUBLICATIONS

Singhal, et al., Using a Position History-Based Protocol for Distributed Object Visualization, 1994 Technical Report, Stanford University, 1994, pp. 1-25 (Year: 1994).*

Stenger, Survivability Analysis of the Iridium Low Earth Orbit Satellite Network, Masters Thesis, Air Force Institute of Technology, 1996, pp. 1-91 (Year: 1996).*

Communication dated Aug. 7, 2018 from the Japanese Patent Office in counterpart Application No. 2017-507098.

(Continued)

*Primary Examiner* — Wilbert L Starks (57) ABSTRACT

A predictor management system includes a storage unit 81 and update history management means 82. The storage unit 81 stores, in association with each of a plurality of prediction targets, an update history of a predictor corresponding to the prediction target. The update history management means 82 stores, in response to updating of a predictor, a prediction target of the predictor and an update time of the predictor in the storage unit 81 in association with each other.

10 Claims, 4 Drawing Sheets

(56) References Cited

OTHER PUBLICATIONS

SAS Institute Inc., "SAS Model Manager", [online], [searched on Jan. 26, 2015], Internet <URL: http://www.sas.com/ja_jp/software/analytics/manager.html> , 4 pages.
International Search Report of PCT/JP2015/001621 dated Jun. 23, 2015 [PCT/ISA/210].

* cited by examiner

| PREDICTION EXPRESSION | UPDATE DATE AND TIME OF CORRESPONDING PREDICTOR | | | | | | |
|---|---|---|---|---|---|---|---|
| PREDICTION TARGET A | 28/10 | 4/11 | 11/11 | 18/11 | 25/11 LAST UPDATE | | |
| PREDICTION TARGET B | 28/10 | 4/11 | 11/11 | 18/11 | 25/11 LAST UPDATE | | |
| PREDICTION TARGET C | 28/10 LAST UPDATE | | | | | | |
| PREDICTION TARGET D | 28/10 | 1/11 | 3/11 | 5/11 | 6/11 | 7/11 | 24/11 LAST UPDATE |
| ... | | | | | | | |

| PREDICTION EXPRESSION | UPDATE DATE AND TIME OF CORRESPONDING PREDICTOR | | | | | | |
|---|---|---|---|---|---|---|---|
| PREDICTION TARGET A | 28/10 PREDICTOR A ver.1 | 4/11 PREDICTOR A ver.2 | 11/11 PREDICTOR A ver.3 | 18/11 PREDICTOR A ver.4 | 25/11 LAST UPDATE PREDICTOR A ver.5 | | |
| PREDICTION TARGET B | 28/10 PREDICTOR B ver.1 | 4/11 PREDICTOR B ver.2 | 11/11 PREDICTOR B ver.3 | 18/11 PREDICTOR B ver.4 | 25/11 LAST UPDATE PREDICTOR B ver.5 | | |
| PREDICTION TARGET C | 28/10 LAST UPDATE PREDICTOR C ver.1 | | | | | | |
| PREDICTION TARGET D | 28/10 PREDICTOR D ver.1 | 1/11 PREDICTOR D ver.2 | 3/11 PREDICTOR D ver.3 | 5/11 PREDICTOR D ver.4 | 6/11 PREDICTOR D ver.5 | 7/11 PREDICTOR D ver.6 | 24/11 LAST UPDATE PREDICTOR D ver.7 |
| ... | | | | | | | |

FIG. 6

PREDICTOR MANAGEMENT SYSTEM, PREDICTOR MANAGEMENT METHOD, AND PREDICTOR MANAGEMENT PROGRAM

CROSS REFERENCE TO RELATED APPLICATIONS

This application is a National Stage of International Application No. PCT/JP2015/001621, filed Mar. 23, 2015, the contents of which are incorporated herein by reference in its entirety.

TECHNICAL FIELD

The present invention relates to a predictor management system, predictor management method, and predictor management program for managing a large number of predictors.

BACKGROUND ART

A predictor is information representing the correlation between an explanatory variable and a response variable. For example, the predictor is a component for predicting the result of the prediction target by calculating the response variable based on the explanatory variable. The predictor is generated by a learner, with learning data for which the value of the response variable has already been obtained and given parameters as input. The predictor may be expressed by, for example, a function c that maps an input x to a correct solution y. The predictor may predict the numerical value of the prediction target, or the label of the prediction target. The predictor may output a variable describing the probability distribution of the response variable. The predictor is also referred to as "model", "learning model", "prediction model", "analytical model", "prediction expression", or the like.

Predictors degrade in prediction accuracy due to environmental changes or with the passage of time. Proper maintenance of predictors is therefore required for their appropriate, long-term operation.

Non Patent Literature (NPL) 1 describes a tool (SAS® Model Manager) for efficient generation, management, and arrangement of analytical models such as prediction models. For example in the case where scoring results change over time, the tool described in NPL 1 performs automatic alert notification that models have degraded.

CITATION LIST

Non Patent Literature

NPL 1: SAS Institute Inc., "SAS Model Manager", [online], [searched on Jan. 26, 2015], Internet <URL: http://www.sas.com/ja_jp/software/analytics/manager.html>

SUMMARY OF INVENTION

Technical Problem

An example of the situation in which prediction is performed using predictors is product demand prediction in convenience stores. For example, the number of predictors used for demand prediction is reduced if all products in one store are predicted using the same predictor. The number of predictors used for demand prediction is equally reduced if one product in a plurality of stores is predicted using the same predictor.

In the case where such a predictor is used, the accuracy of demand prediction for an average store or an average product is likely to be high, but the accuracy of demand prediction for a minor store or a unique product is likely to be low. Moreover, according to the inventors' findings, the use of a large number of predictors for prediction can enhance the prediction accuracy of each of a large number of prediction targets that differ in tendency. For these reasons, the use of product-specific and store-specific predictors is preferable in order to enhance demand prediction accuracy.

In the case of using product-specific and store-specific predictors, for example if the number of stores and the number of products are each on the order of thousands, the number of predictors is on the order of millions. Hence, when managing a large number of predictors that are updated according to need, a commonly known predictor management method is not practical because massive amounts of computational resources and human resources are needed.

For example, the tool described in NPL 1 does not provide any function of efficiently managing a large number of predictors, and so cannot be used to appropriately manage a large number of predictors. It is therefore desirable to enable efficient management of the update statuses of a large number of predictors.

The present invention accordingly has an object of providing a predictor management system, predictor management method, and predictor management program that can efficiently manage the update statuses of a large number of predictors.

Solution to Problem

A predictor management system according to the present invention includes: a storage unit storing, in association with each of a plurality of prediction targets, an update history of a predictor corresponding to the prediction target; and update history management means which stores, in response to updating of a predictor, a prediction target of the predictor and an update time of the predictor in the storage unit in association with each other.

A predictor management method according to the present invention is a predictor management method wherein a computer stores, in response to updating of a predictor, a prediction target of the predictor and an update time of the predictor in a storage unit in association with each other, the storage unit storing, in association with each of a plurality of prediction targets, an update history of a predictor corresponding to the prediction target.

A predictor management program according to the present invention causes a computer to execute an update history management process of storing, in response to updating of a predictor, a prediction target of the predictor and an update time of the predictor in a storage unit in association with each other, the storage unit storing, in association with each of a plurality of prediction targets, an update history of a predictor corresponding to the prediction target.

Advantageous Effects of Invention

According to the present invention, the update statuses of a large number of predictors can be managed efficiently.

DESCRIPTION OF EMBODIMENT

The following describes exemplary embodiments of the present invention with reference to drawings. The following description assumes a prediction system that performs prediction using a large number of predictors. A predictor management system according to the present invention manages each predictor used in the prediction system.

The predictor management system according to the present invention itself may perform prediction using a large number of predictors. Alternatively, the predictor management system according to the present invention may manage each predictor in another system that uses a large number of predictors. The exemplary embodiments described below assume that the predictor management system itself updates predictors and also manages their update histories.

The following description also assumes a prediction system in which a large number of predictors are updated at various timings. For example, consider product demand prediction for a supermarket. Suppose 100 stores are located in one region, and each store offers a selection of 5000 products. In such a case, the prediction system performs prediction using 100×5000=500000 predictors. These many predictors are each automatically updated, for example, at a timing when its index related to prediction accuracy falls below a predetermined threshold. Here, the timing when the index related to prediction accuracy falls below the predetermined threshold differs among the predictors. Hence, the update timings of the 500000 predictors do not always match.

There are also various update timings other than automatically updates resulting from the comparison with the predetermined threshold. Examples include periodically updating (relearning) a predictor, and a data scientist manually determining an update timing and updating a predictor at the timing. The predictor management system according to the present invention does not depend on predictor update timings, and so is applicable to any system for managing the update statuses of predictors.

Exemplary Embodiment 1

Figure 1:
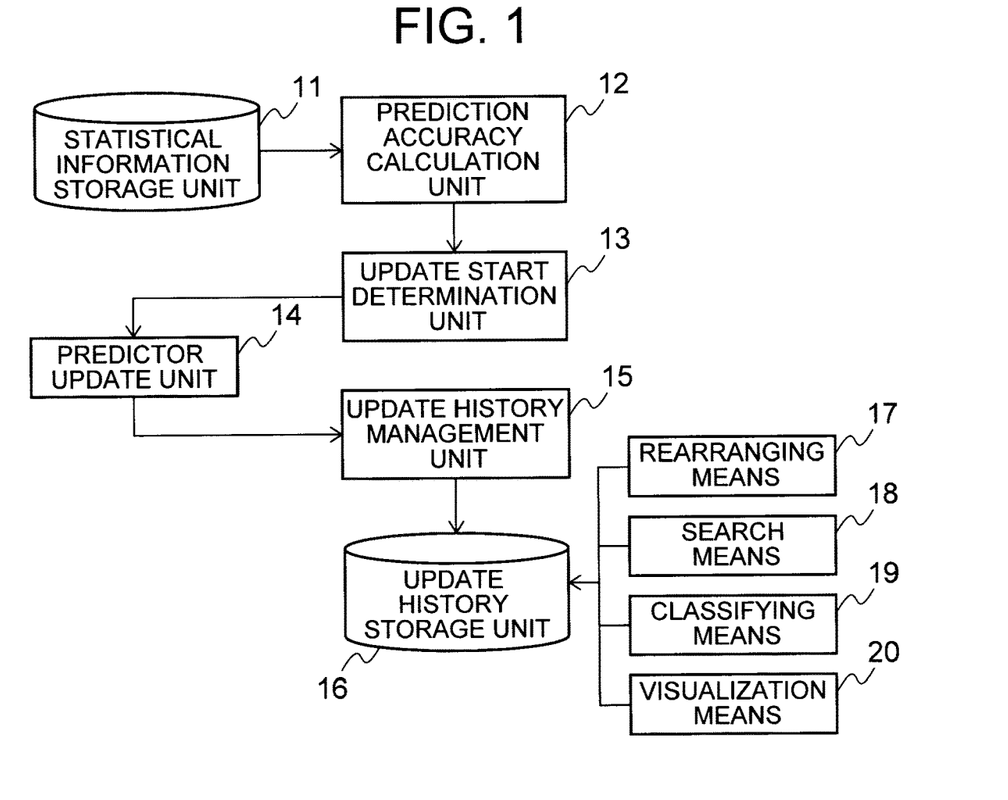
FIG. 1 is a block diagram depicting an example of the structure of Exemplary Embodiment 1 of a predictor management system according to the present invention.

FIG. 1 is a block diagram depicting an example of the structure of Exemplary Embodiment 1 of a predictor management system according to the present invention. The predictor management system in this exemplary embodiment includes a statistical information storage unit 11, a prediction accuracy calculation unit 12, an update start determination unit 13, a predictor update unit 14, an update history management unit 15, an update history storage unit 16, rearranging means 17, search means 18, classifying means 19, and visualization means 20.

The statistical information storage unit 11 stores information necessary for the below-mentioned prediction accuracy calculation unit 12 to calculate the prediction accuracy of each predictor. The storage contents of the statistical information storage unit 11 are determined beforehand depending on the method of calculating the prediction accuracy of each predictor. For example, the statistical information storage unit 11 may store a predicted value obtained using the predictor and an actual value in association with each other. The statistical information storage unit 11 may store not only the actual value, but also information (e.g. mean error or maximum error) indicating the accuracy of the predictor calculated according to the actual value. The statistical information storage unit 11 may store not only the accuracy of the predictor, but also a result (e.g. sales amount, the number of complaints about the prediction target, etc.) related to the prediction target predicted using the predictor.

The prediction accuracy calculation unit 12 calculates the prediction accuracy of each predictor. In detail, the prediction accuracy calculation unit 12 calculates the prediction accuracy of each predictor currently in operation, based on the information stored in the statistical information storage unit 11. The prediction accuracy calculation unit 12 may calculate, for example, a mean error or a maximum error. The prediction accuracy calculated is, however, not limited to such.

Any type of prediction accuracy may be calculated, and any method may be used to calculate the prediction accuracy. The calculated prediction accuracy is used when the below-mentioned update start determination unit 13 performs update start determination.

The update start determination unit 13 determines whether or not to update a predictor, and instructs the predictor update unit 14 to update the predictor. In detail, the update start determination unit 13 determines whether or not to update the predictor, based on the prediction accuracy calculated by the prediction accuracy calculation unit 12.

The update start determination unit 13 may determine whether or not to update the predictor, based on not only the prediction accuracy but also the update cost when updating (relearning) the predictor. Examples of the update cost include financial cost and computer resources. In detail, the update start determination unit 13 may compare the "update cost" and the "merit expected as a result of accuracy improvement by update" (hereafter simply referred to as "merit") and, in the case where the "merit" exceeds the "update cost", determine that the predictor needs to be updated, and instruct the predictor update unit 14 to update the predictor.

The update start determination unit 13 may, for example, predefine a function or rule for converting merit into cost, and compare the "merit" and the "update cost" using the function. For example, suppose the update start determination unit 13 holds a function associating the "accuracy improvement by update" with the "update cost". In this case, the update start determination unit 13 predicts the "merit", and assigns the predicted merit to the function to convert the "merit" into an index indicating financial cost or computer resources (i.e. "merit by update converted into the index"). The update start determination unit 13 then compares the "update cost" and the index obtained by the conversion. In the case where the "update cost" is less than the index as a result of the comparison, the update start determination unit 13 instructs the predictor update unit 14 to update the predictor.

In the case of determining to update the predictor, the update start determination unit 13 may determine the update method (relearning method), the range of data (relearning data) used for the update, and the like. Any method may be used to determine the update method and the data used for the update. For example, the update method and the data used for the update may be set beforehand depending on the predictor. In this case, when instructing the predictor update unit 14 to update the predictor, the update start determination unit 13 may send the update method (relearning method) and the data (relearning data) used for the update together with the update instruction.

The predictor update unit 14 updates the predictor as instructed. For example, in the case of receiving the update instruction together with the relearning method and the relearning data from the update start determination unit 13, the predictor update unit 14 updates the predictor based on the received information.

The predictor update unit 14 may, for example, update the predictor based on the update instruction from the data scientist. In this case, the statistical information storage unit 11, the prediction accuracy calculation unit 12, and the update start determination unit 13 in the predictor management system may be omitted.

Having updated the predictor, the predictor update unit 14 provides information about the update to the update history management unit 15. For example, the predictor update unit 14 may notify the update history management unit 15 of the contents of the updated predictor and the update date and time. In the case where there is another system that updates the predictor, however, the predictor update unit 14 in the predictor management system in this exemplary embodiment may be omitted.

The update history management unit 15 manages, in response to the updating of the predictor, the history of the predictor stored in the update history storage unit 16. In detail, in response to the updating of the predictor, the update history management unit 15 stores the prediction target of the predictor and the update time of the predictor in the update history storage unit 16 in association with each other. For example, the update history management unit 15 may manage the history of the predictor in response to the updating of the predictor meeting a prediction accuracy degradation condition. The method by which the update history management unit 15 manages the update history of the predictor stored in the update history storage unit 16 will be described later.

The update history storage unit 16 stores, for each of a plurality of prediction targets, the update history of the predictor corresponding to the prediction target (i.e. the predictor for predicting the prediction target). The update history storage unit 16 may store the predictor itself. The update history storage unit 16 may store only the latest predictor, or store not only the latest predictor but also one or more past predictors. In other words, the update history management unit 15 may manage only the latest predictor, or manage not only the latest predictor but also one or more past predictors.

In the case where the prediction system is a system other than the predictor management system in this exemplary embodiment, the update history storage unit 16 does not need to store the predictor itself, as long as the prediction system stores the predictor. The predictor is assigned information associated with the prediction target.

Figure 2:
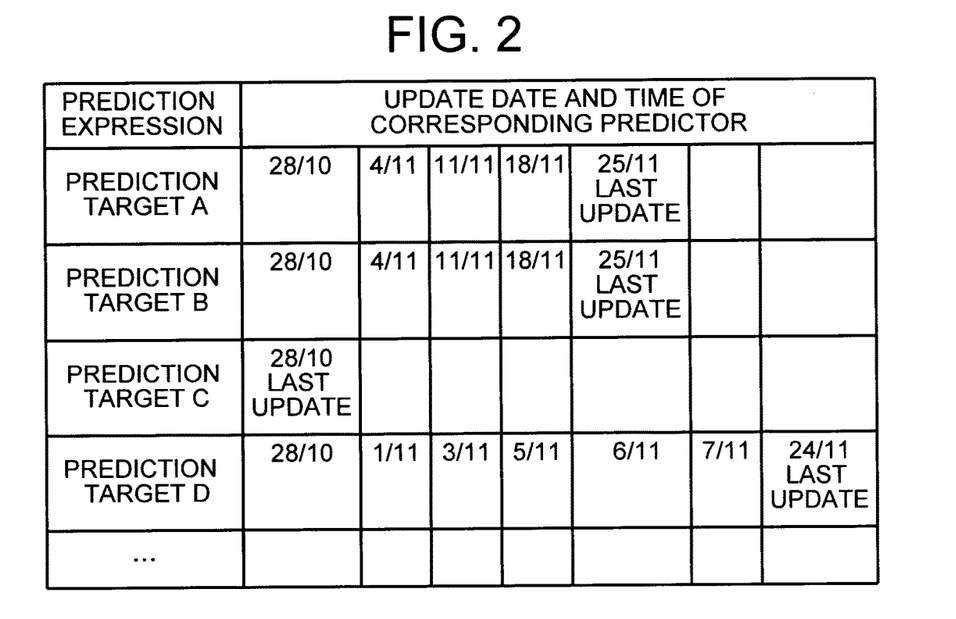
FIG. 2 is an explanatory diagram depicting an example of update histories.

FIG. 2 is an explanatory diagram depicting an example of update histories stored in the update history storage unit 16. In the example depicted in FIG. 2, the update history storage unit 16 stores, in association with each prediction target, the update history of a plurality of predictors that differ in update time. In this case, the update history management unit 15 stores the update history of the updated predictor in the update history storage unit 16 further in association with the prediction target. Each time the update history management unit 15 adds the update history, the update history management unit 15 may add information indicating "last update" to the update history so that the last update time can be easily specified, as depicted in FIG. 2.

Thus, in this exemplary embodiment, the update history storage unit 16 stores, in association with each of the plurality of prediction targets, the update history of the predictor for predicting the prediction target. This allows an administrator to collectively manage the update statuses of a large number of predictors. For example, the administrator can easily search the update histories in FIG. 2 for a prediction target such as "prediction target corresponding to a predictor updated on November 11" or "prediction target corresponding to a predictor not updated for the past month".

The update history storage unit 16 may store, in response to updating of a predictor meeting the prediction accuracy degradation condition, the prediction target of the predictor and the update time of the predictor in association with each other. The period to updating of a predictor based on the prediction accuracy degradation condition corresponds to the period during which the predictor can maintain desired prediction accuracy, unlike periodic updates and the like. By storing the history of such update period in the update history storage unit 16, various analyses (e.g. whether or not the relearning method is problematic, whether or not the prediction target is unique, etc.) can be made even with a large number of predictors. This enables not only efficient management of the update statuses of a large number of predictors, but also appropriate management of the update contents of the predictors.

Referring back to FIG. 1, the rearranging means 17 rearranges the prediction targets based on the update histories of the predictors. The rearranging means 17 may rearrange the prediction targets by any method. In detail, the rearranging means 17 may rearrange the plurality of prediction targets stored in the update history storage unit 16 according to, for example, the update frequency of the predictor corresponding to the prediction target, the update time interval of the predictor corresponding to the prediction target, or the time elapsed from the previous update of the predictor corresponding to the prediction target. The rearranging means 17 preferably rearranges the prediction targets according to priority relating to a significant criterion so that a prediction target of interest can be specified from among a large number of prediction targets.

For example, the rearranging means 17 may assign priority based on any of the following criteria:

(1) When the update frequency of the predictor corresponding to the prediction target is higher, the prediction target is assigned higher priority.

(2) When the period during which the predictor corresponding to the prediction target is not updated is longer, the prediction target is assigned higher priority.

(3) When the predictor corresponding to the prediction target is more periodically updated, the prediction target is assigned higher priority.

(4) When the predictor corresponding to the prediction target is more randomly updated, the prediction target is assigned higher priority.

(5) When the update interval of the predictor corresponding to the prediction target tends to shorten, the prediction target is assigned higher priority.

For example, in the case of (5), the prediction accuracy seems to degrade severely. Such an prediction target is of more interest.

The rearranging means 17 may output the rearrangement result. The rearranging means 17 may add information (ordinal rank, priority) necessary for the rearrangement, to the prediction target.

This exemplary embodiment assumes the management of a large number of prediction targets (predictors). By rearranging the prediction targets based on the update histories of the predictors by the rearranging means 17, a prediction target of more interest is easily recognized from among a large number of prediction targets.

In detail, the administrator can sort the information stored in the update history storage unit 16, based on the priority assigned by the rearranging means 17. Moreover, in the case of visualizing prediction targets, a predetermined number of prediction targets higher in priority can be preferentially visualized from among a large number of prediction targets.

The search means 18 searches for a prediction target or predictor meeting a predetermined condition, based on the update histories stored in the update history storage unit 16. For example, the operator can search for a prediction target in terms of "which prediction target corresponds to a predictor updated within 10 days from now", "which prediction target corresponds to a predictor not updated for 10 days", or "which prediction target corresponds to a predictor updated on November 25", through the use of the search means 18.

The classifying means 19 classifies the prediction targets based on the update histories of the predictors stored in the update history storage unit 16. The classifying means 19 may classify the prediction targets into a plurality of groups according to, for example, the update frequency of the predictor corresponding to the prediction target, the update time interval of the predictor corresponding to the prediction target, the tendency of change of the time interval (e.g. the update interval tends to shorten (or lengthen)), or the time elapsed from the previous update of the predictor corresponding to the prediction target. Many methods of data classification based on such criteria are known, and the classifying means 19 may use any method to classify the prediction targets.

The visualization means 20 visualizes, for each prediction target, the update history of the predictor stored in the update history storage unit 16. For example, the visualization means 20 may visualize, for each prediction target, the update history in tabular form associating the prediction target with a plurality of update times of the prediction target as depicted in FIG. 2.

Figure 3:
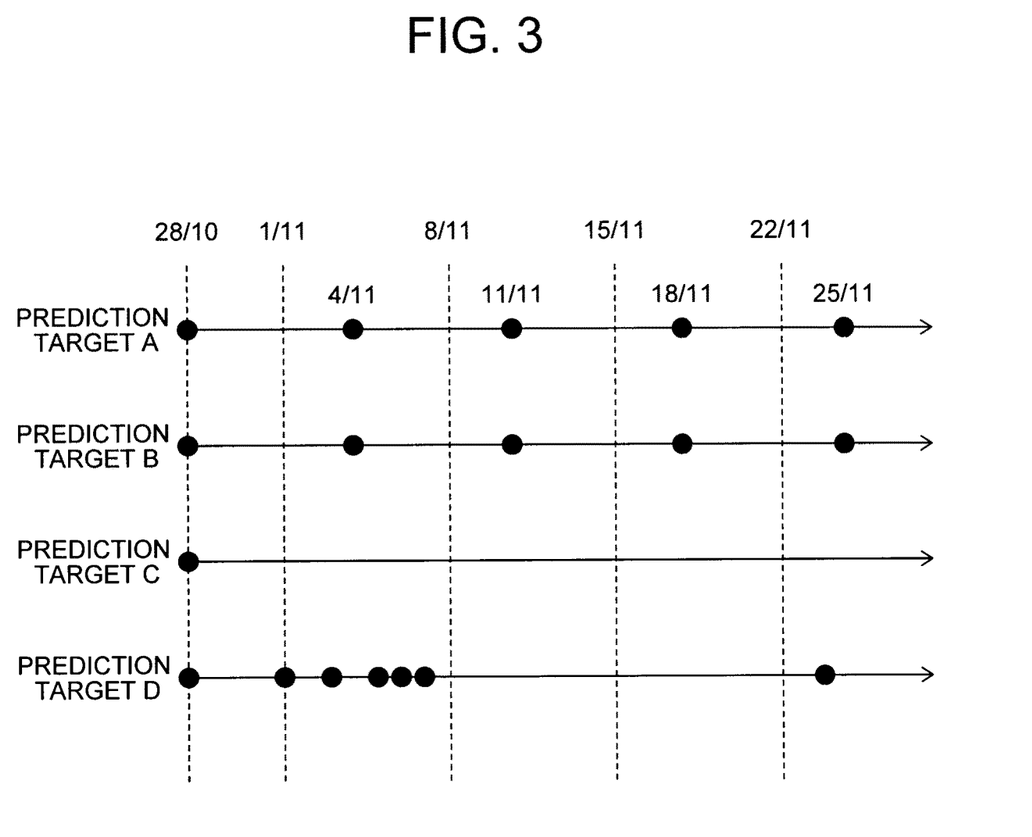
FIG. 3 is an explanatory diagram depicting an example of visualizing update histories.

FIG. 3 is an explanatory diagram depicting an example of visualizing update histories. The visualization means 20 may generate a graph in which, for each prediction target, a symbol representing the updating of the predictor corresponding to the prediction target is located at the position corresponding to the update time of the predictor on the time axis provided for the prediction target, and visualize the graph, as depicted in FIG. 3.

The update histories in the graph depicted in FIG. 3 correspond to the table of update histories depicted in FIG. 2. For example, by referencing to the graph depicted in FIG. 3, it is possible to recognize at a glance that the predictor for prediction target A and the predictor for prediction target B were updated at the same timings. Moreover, by referencing to the graph depicted in FIG. 3, it is possible to recognize at a glance that the predictor for prediction target C has not been updated after October 28, and that the predictor for prediction target D was updated with a very high frequency from October 28 to November 7.

The prediction accuracy calculation unit 12, the update start determination unit 13, the predictor update unit 14, the update history management unit 15, the rearranging means 17, the search means 18, the classifying means 19, and the visualization means 20 are realized by a CPU in a computer operating according to a program (predictor management program).

For example, the program may be stored in a storage unit (not depicted) in the predictor management system, with the CPU reading the program and, according to the program, operating as the prediction accuracy calculation unit 12, the update start determination unit 13, the predictor update unit 14, the update history management unit 15, the rearranging means 17, the search means 18, the classifying means 19, and the visualization means 20.

Alternatively, the prediction accuracy calculation unit 12, the update start determination unit 13, the predictor update unit 14, the update history management unit 15, the rearranging means 17, the search means 18, the classifying means 19, and the visualization means 20 may each be realized by dedicated hardware. The statistical information storage unit 11 and the update history storage unit 16 are, for example, each a magnetic disk device or the like. The predictor management system according to the present invention may be composed of two or more physically separate devices that are wiredly or wirelessly connected to each other.

Figure 4:
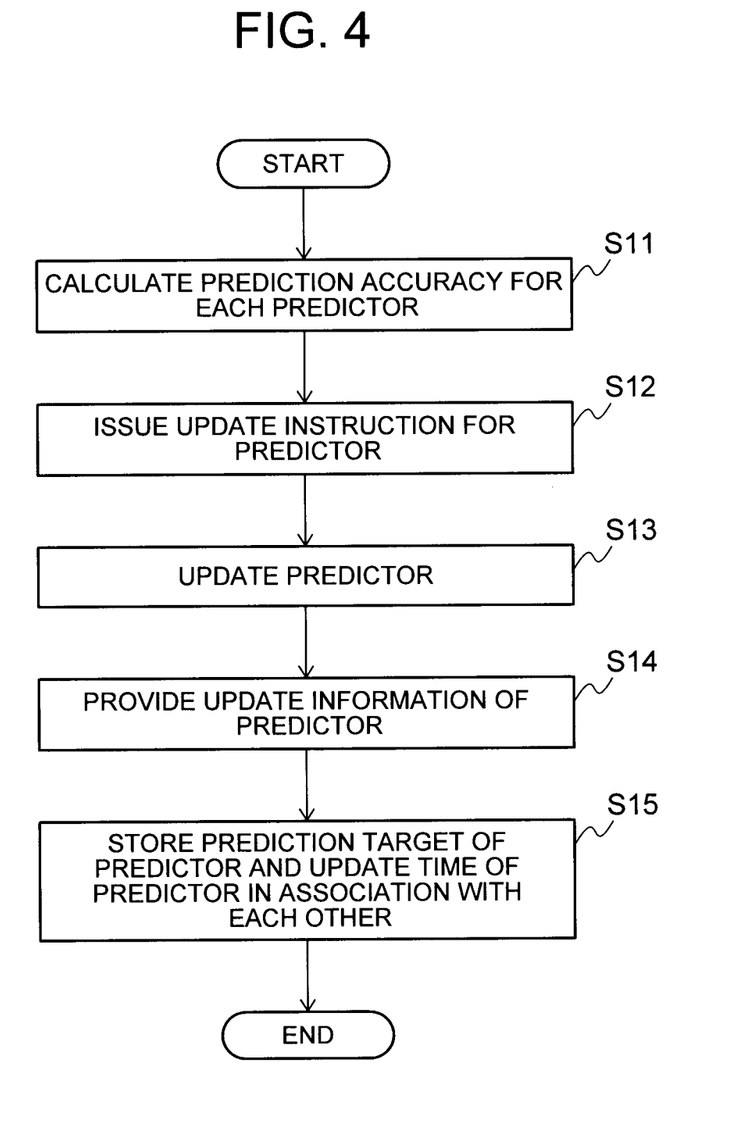
FIG. 4 is a flowchart depicting an example of the operation of the predictor management system.

The following describes the operation of the predictor management system in this exemplary embodiment. FIG. 4 is a flowchart depicting an example of the operation of the predictor management system in this exemplary embodiment.

The prediction accuracy calculation unit 12 calculates prediction accuracy for each predictor, based on the information stored in the statistical information storage unit 11 (step S11). The update start determination unit 13 determines whether or not to update the predictor based on the calculated prediction accuracy, and instructs the predictor update unit 14 to update the predictor (step S12). The predictor update unit 14 updates the target predictor, based on the update instruction (step S13). The predictor update unit 14 provides update information of the predictor to the update history management unit 15 (step S14). The update history management unit 15 stores the prediction target of the predictor and the update time of the predictor in the update history storage unit 16 in association with each other, based on the update information of the predictor (step S15).

As described above, in this exemplary embodiment, the update history management unit 15 stores, in response to updating of a predictor, the prediction target of the predictor and the update time of the predictor in the update history storage unit 16 in association with each other. Thus, the update history storage unit 16 in this exemplary embodiment does not simply hold the update time of each predictor, but stores, in association with each of a plurality of prediction targets, the update history of the predictor corresponding to the prediction target. This enables efficient management of the update statuses of a large number of predictors.

Exemplary Embodiment 2

The following describes Exemplary Embodiment 2 of a predictor management system according to the present invention. This exemplary embodiment describes in more detail the case where the update history management unit 15 also manages one or more past predictors before update.

The advantage of holding past predictors is explained below. For example, suppose prediction targets are seasonally variable. When predicting the sales of oshiruko (red bean soup) in January 2015, a predictor learned based on the data of the same time (e.g. January 2014) in the last year is likely to have higher prediction accuracy than a predictor learned based on the most recent (e.g. December 2014) data. The effect is higher in the case where the update interval of the predictor is shorter.

Furthermore, if a plurality of predictors are available, prediction accuracy can be calculated by performing prediction using an old predictor, too. Using such prediction accuracy of a past predictor, update determination or prediction accuracy reporting can be made.

The predictor management system in this exemplary embodiment has the same structure as the predictor management system in Exemplary Embodiment 1. This exemplary embodiment, however, differs from Exemplary Embodiment 1 in the contents of update histories stored in the update history storage unit 16 and the method of update history management by the update history management unit 15.

Figure 5:
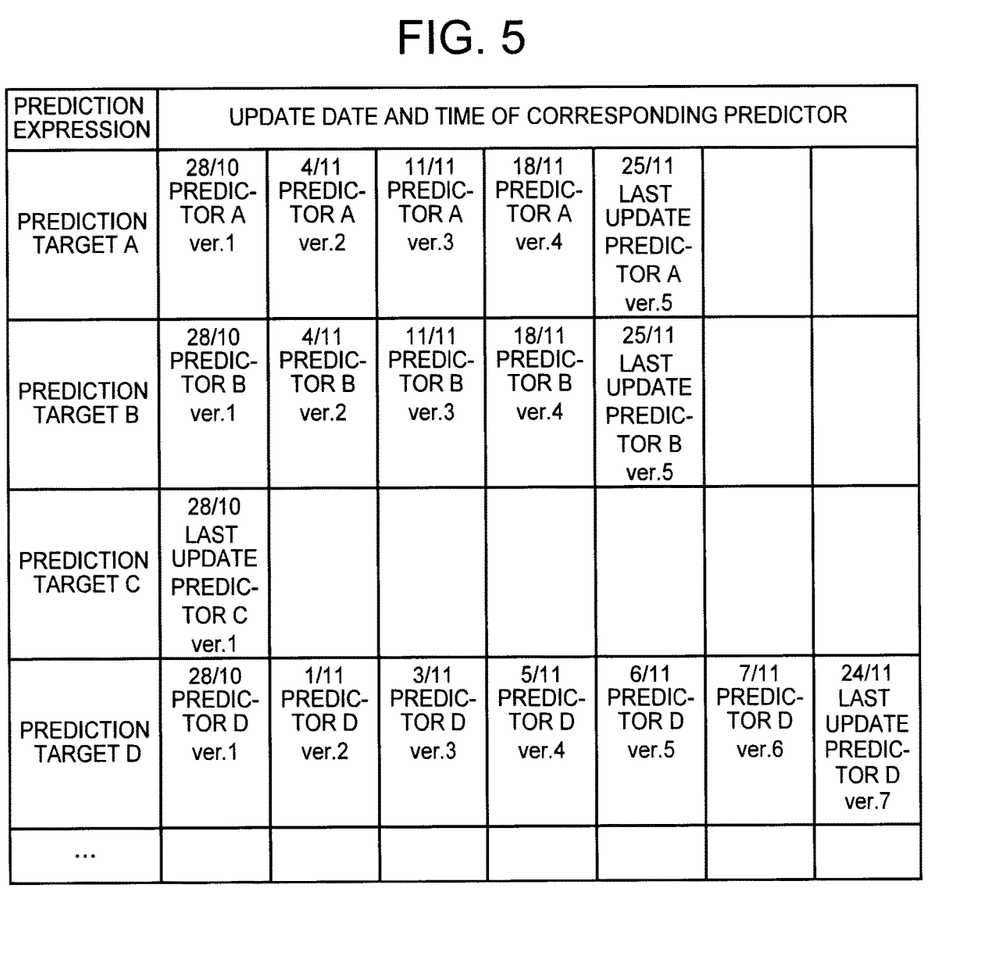
FIG. 5 is an explanatory diagram depicting another example of update histories.

FIG. 5 is an explanatory diagram depicting another example of update histories stored in the update history storage unit 16. In the example depicted in FIG. 5, the update history storage unit 16 stores, in association with each prediction target, the update history of a plurality of predictors that differ in update time, together with the predictor versions.

The update history management unit 15 in this exemplary embodiment performs version management for the updated predictor as follows. Each time the predictor is updated, the update history management unit 15 specifies a number (hereafter referred to as "version number") indicating its version based on a predetermined rule, and stores the update history together with the version number in the update history storage unit 16. In the example depicted in FIG. 5, the update history management unit 15 increments the version number by 1 each time it adds the update history, and stores the update history together with the version number in the update history storage unit 16. The method of specifying the version number is not limited to the aforementioned method. The update history management unit 15 may change the method of specifying the version number, depending on the predictor update method. Examples of the predictor update (relearning) method include a method (hereafter referred to as "relearning method 1") of regenerating a completely new predictor while ignoring the old predictor, and a method (hereafter referred to as "relearning method 2") of updating the predictor using new learning data based on the old predictor.

Other examples of the predictor update (relearning) method include a method (hereafter referred to as "relearning method 3") of updating only coefficients by relearning without changing the type of explanatory variable used in the predictor, and a method (hereafter referred to as "relearning method 4") of performing relearning including the selection of an explanatory variable. The predictor update method is not limited to these relearning methods 1 to 4.

The update history management unit 15 determines the version number assigned in the update order of predictors for predicting the same prediction target, depending on the predictor update method. For example, suppose relearning method 1 and relearning method 2 are used as the method of updating predictor A. Also suppose the version number of predictor A is expressed as "verN.M" (N and M are positive integers). Here, the update history management unit 15 may increment the value of M by 1 in the case where the predictor is updated by relearning method 1, and increment the value of N by 1 in the case where the predictor is updated by relearning method 2.

In detail, in the case where predictor A is updated by relearning method 1, the version number changes as "predictor A ver1.0→predictor A ver1.1→predictor A ver1.2→predictor A ver1.3". In the case where predictor A is updated by relearning method 2, the version number changes as "predictor A ver1.0→predictor A ver2.0→predictor A ver3.0→predictor A ver4.0". The identification information and version number of a predictor can be collectively referred to as the name of the predictor. This suggests that the update history management unit 15 changes the rule of naming the predictor depending on the relearning method.

The update history management unit 15 then adds the version number to the update history of the predictor, and stores them in the update history storage unit 16.

Thus, the update history management unit 15 changes the version number added to the update history of the predictor depending on the predictor update method. This enables more efficient version management for predictors.

The following describes how the operator uses the information stored in the update history storage unit 16, using two examples.

The first example is described below, with reference to FIG. 5. The first example assumes the case where each predictor stored in the update history storage unit 16 is a predictor for predicting the sales quantity of a product in a store per day. In FIG. 5, for example, prediction target A is salmon onigiri, prediction target B is ume onigiri, prediction target C is a carbonated beverage, and prediction target D is a ballpoint pen.

The first example also assumes the case where the update start determination unit 13 determines whether or not to update a predictor by the following criterion. In the case where the prediction error on one day is more than 10% for a prediction target, the update start determination unit 13 determines to update the predictor for predicting the prediction target on the following day.

For example, suppose, on November 24, some unexpected event limited only to that day occurred and the sales of onigiri were 10 times higher than usual. Also suppose each of the predictor for predicting prediction target A and the predictor for predicting prediction target B was unable to respond to such an unexpected event and predicted the sales quantity of onigiri as usual. In such a case, the predicted value differs greatly from the actual value. Given this difference between the predicted value and the actual value, the update start determination unit 13 determines to update the predictor for predicting prediction target A and the predictor for predicting prediction target B on November 25 following November 24. In response to the determination by the update start determination unit 13, the predictor update unit 14 updates the predictor for predicting prediction target A and the predictor for predicting prediction target B. Here, the predictor update unit 14 updates each predictor on November 25, using learning data including the actual value on November 24.

However, since the event occurred on November 24 was an unexpected event limited only to that day, it is not preferable to update the predictor for predicting prediction target A and the predictor for predicting prediction target B.

With the predictor updated using the learning data including the actual value on November 24 when the unexpected event occurred, the prediction accuracy on each day when no unexpected event occurs decreases.

Here, suppose the operator knew that, on November 24, the unexpected event limited only to that day occurred. In this case, the operator searches for a prediction target in terms of "which prediction target corresponds to a predictor updated on November 25", using the search means 18. Prediction targets A and B are found as a result. The operator then checks, for each of prediction targets A and B, the update history of the predictor. For prediction target A, the operator may modify setting so that not "predictor A ver.5" updated on November 25 but the immediately preceding version "predictor A ver.4" is continuously used. The same applies to prediction target B. This completes the description of the first example of how the operator uses the information stored in the update history storage unit 16.

A second example of how the operator uses the information stored in the update history storage unit 16 is described next, with reference to FIG. 5. As depicted in FIG. 5, the predictor for predicting prediction target D is updated with high frequency. The operator rearranges the prediction targets stored in the update history storage unit 16 in descending order of predictor update frequency using the rearranging means 17, and displays them. As a result, prediction target D with high update frequency is displayed at a higher rank.

Typically, updating a predictor requires cost such as financial cost and computer resources. Frequently updating a predictor requires considerable cost. The operator checks the details of each prediction target displayed at a higher rank by the rearranging means 17, such as update history and prediction accuracy. The operator may then, for example, change the update rule set in the update start determination unit 13, to reduce the subsequent predictor update cost. This completes the description of the second example of how the operator uses the information stored in the update history storage unit 16.

Figure 6:
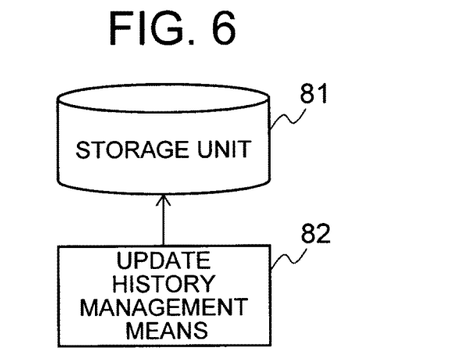
FIG. 6 is a block diagram schematically depicting a predictor management system according to the present invention.

The following describes an overview of the present invention. FIG. 6 is a block diagram schematically depicting a predictor management system according to the present invention. A predictor management system according to the present invention includes: a storage unit 81 (e.g. the update history storage unit 16) storing, in association with each of a plurality of prediction targets, an update history of a predictor corresponding to the prediction target; and update history management means 82 (e.g. the update history management unit 15) which stores, in response to updating of a predictor, a prediction target of the predictor and an update time of the predictor in the storage unit 81 in association with each other.

With such a structure, the update statuses of a large number of predictors can be managed efficiently.

The storage unit 81 may store, in association with the prediction target, update histories of a plurality of predictors that differ in update time, and the update history management means 82 may store an update history of the updated predictor in the storage unit 81 further in association with the prediction target. With such a structure, the update intervals of a large number of predictors can also be managed efficiently.

The update history management means 82 may determine, depending on a predictor update method, a version number assigned in update order of predictors for predicting the same prediction target, and store, in the storage unit, an update history of the predictor to which the version number is added. With such a structure, the changes of the update methods of a large number of predictors can also be managed efficiently.

The predictor management system may include rearranging means (e.g. the rearranging means 17) which rearranges the plurality of prediction targets stored in the storage unit 81, according to an update frequency of the predictor corresponding to the prediction target, an update time interval of the predictor corresponding to the prediction target, or a time elapsed from a previous update of the predictor corresponding to the prediction target. With such a structure, predictors in a desired range can be managed preferentially from among a large number of predictors.

The predictor management system may include classifying means (e.g. the classifying means 19) which classifies the plurality of prediction targets stored in the storage unit 81 into a plurality of groups, according to an update frequency of the predictor corresponding to the prediction target, a tendency of a change of an update time interval of the predictor corresponding to the prediction target, or a time elapsed from a previous update of the predictor corresponding to the prediction target. With such a structure, a group of predictors having a desired feature can be managed efficiently from among a large number of predictors.

The predictor management system may include visualization means (e.g. the visualization means 20) which generates a graph (e.g. the graph depicted in FIG. 3) in which, for each of the plurality of prediction targets stored in the storage unit 81, a symbol representing updating of the predictor corresponding to the prediction target is located at a position corresponding to an update time of the predictor on a time axis provided for the prediction target. With such a structure, the update statuses of a large number of predictors are recognizable at a glance.

The update history management means 82 may store, in response to updating of a predictor meeting a prediction accuracy degradation condition from among predictors, a prediction target of the predictor and an update time of the predictor in the storage unit 81 in association with each other. With such a structure, the period during which desired prediction accuracy can be maintained based on the degradation condition can be recognized. This enables not only efficient management of the update statuses of a large number of predictors but also appropriate management of the update contents of the predictors.

REFERENCE SIGNS LIST 11 statistical information storage unit
12 prediction accuracy calculation unit
13 update start determination unit
14 predictor update unit
15 update history management unit
16 update history storage unit
17 rearranging means
18 search means
19 classifying means
20 visualization means

The invention claimed is:

1. A predictor management system comprising:
hardware including a processor;
a storage unit storing, in association with each of a plurality of prediction targets, an update history of a predictor corresponding to the prediction target; and
an update history management unit implemented at least by the hardware and stores, in response to updating of a predictor, a prediction target of the predictor and an update time of the predictor in the storage unit in association with each other,
wherein the update history management unit determines, depending on a predictor update method, a version number assigned in update order of predictors for predicting the same prediction target, and stores, in the storage unit, an update history of the predictor to which the version number is added.

2. The predictor management system according to claim 1, wherein the storage unit stores update histories of a plurality of predictors that differ in update time, and
wherein the update history management unit stores an update history of the updated predictor in the storage unit further in association with the prediction target.

3. The predictor management system according to claim 1, comprising
a rearranging unit implemented at least by the hardware and which rearranges the plurality of prediction targets stored in the storage unit, according to an update frequency of the predictor corresponding to the prediction target, an update time interval of the predictor corresponding to the prediction target, or a time elapsed from a previous update of the predictor corresponding to the prediction target.

4. The predictor management system according to claim 1, comprising
a classifying unit implemented at least by the hardware and which classifies the plurality of prediction targets stored in the storage unit into a plurality of groups, according to an update frequency of the predictor corresponding to the prediction target, a tendency of a change of an update time interval of the predictor corresponding to the prediction target, or a time elapsed from a previous update of the predictor corresponding to the prediction target.

5. The predictor management system according to claim 1, comprising
a visualization unit implemented at least by the hardware and which generates a graph in which, for each of the plurality of prediction targets stored in the storage unit, a symbol representing updating of the predictor corresponding to the prediction target is located at a position corresponding to an update time of the predictor on a time axis provided for the prediction target.

6. The predictor management system according to claim 1, wherein the update history management unit stores, in response to updating of a predictor meeting a prediction accuracy degradation condition from among predictors, a prediction target of the predictor and an update time of the predictor in the storage unit in association with each other.

7. A predictor management method, implemented by a computer, storing, in response to updating of a predictor, a prediction target of the predictor and an update time of the predictor in a storage unit in association with each other, the storage unit storing, in association with each of a plurality of prediction targets, an update history of a predictor corresponding to the prediction target.

8. The predictor management method according to claim 7, wherein the computer stores, in response to updating of a predictor meeting a prediction accuracy degradation condition from among predictors, a prediction target of the predictor and an update time of the predictor in the storage unit in association with each other.

9. A non-transitory computer readable information recording medium storing a predictor management program, when executed by a processor, that performs a method for, storing, in response to updating of a predictor, a prediction target of the predictor and an update time of the predictor in a storage unit in association with each other, the storage unit storing, in association with each of a plurality of prediction targets, an update history of a predictor corresponding to the prediction target.

10. The non-transitory computer-readable recording medium according to claim 9, wherein the computer stores, in response to updating of a predictor meeting a prediction accuracy degradation condition from among predictors, a prediction target of the predictor and an update time of the predictor in the storage unit in association with each other.

* * * * *